7183X
J. Bennett,
Gridiron.
Patented July 25. 1832.
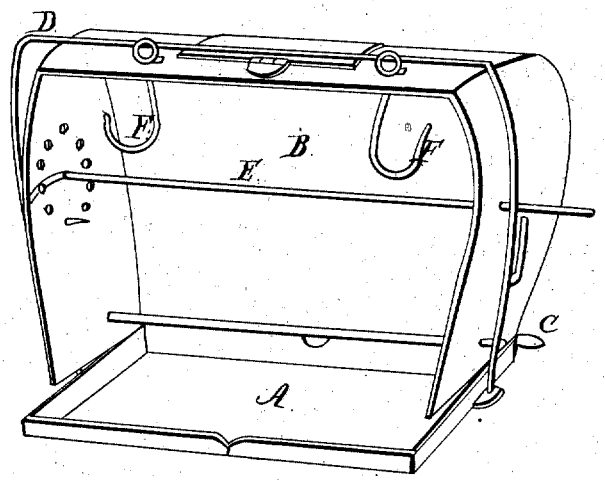
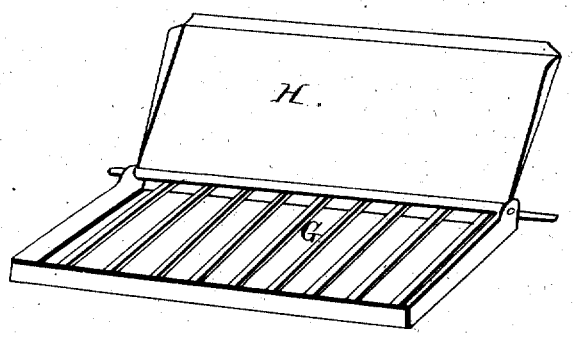

7183x

Jul 25, 1832

To all to whom these presents shall come: Be it known
that I, James Bennet of the town of Brutus, County of
Cayuga and State of New York, have invented a new and
useful improvement in a cooking machine for roasting
baking and frying meats and for baking bread and pies
and pan cakes; And that the following is a full and exact
descripton of the construction and operation of the said machine 7183x July 25, 1832 as invented or improved by me. The machine consists of a wrought or hot metal bottom to be about as wide again as it is long to be made with or without legs. The rim to project up high enough to answer the purpose of a griddle, spider or pan. The front part to have a lip in it for the purpose of pouring out gravy. The back part to have an ear on each corner to extend above the top of the rim about one and a fourth inch. The one ear to have a hole in it and the other a slit with a hook attached to it to turn over, a wire is attached to the bottom part of the oven to fasten it to the bottom. There is to be an ear on each end to admit in a bail which is to extend far enough above the top of the oven to be convenient to handle it.

The oven is to be made of tin, the back and ears are to be made oval so that a small bottom will admit of a large oven. There is to be a rod or spit passing through the meat to be baked or roasted in the same, which may be removed, and two other rods inserted for the purpose of setting on pans for baking bread or pies. There may also be hooks placed in the upper part of the oven for the purpose of roasting fowls or chickens. The oven may be removed and a grid iron attached to the same ears and by the same hook for the purpose of toasting bread, warming and boiling meat. Said grid iron is to be constructed with round or flatted rods, and to stand in an elevated manner over the coals so as to conduct the gravy into the bottom of the machine, which serves as a dripping pan. The grid iron is to have a tin reflector, attached to the lower end by a wire to shut over the meat to keep off dust, and draw the heat, so as to cause both sides to cook at the same time. The grid iron is to have a strap attached to it with notches in the same to catch in a hook attached to the side of the bail, to elevate it as occasion may require. The back part of the bottom is to have in it a hook which serves as a handle for pouring out the gravy and also as a foot or 7183x July 25, 1832

Love when the gold mine is opened.

Witnesses James Bennett

H. R. Riley

Theodore Reffle (Patented July 25, 1832)

(530 acres)